(12) United States Patent
Roever et al.

(10) Patent No.: US 10,909,903 B2
(45) Date of Patent: Feb. 2, 2021

(54) PARALLEL IMPLEMENTATION OF A DITHERING ALGORITHM FOR HIGH DATA RATE DISPLAY DEVICES

(71) Applicant: NVIDIA CORPORATION, Santa Clara, CA (US)

(72) Inventors: Jens Roever, Los Gatos, CA (US); Robert Jan Schutten, San Jose, CA (US)

(73) Assignee: NVIDIA Corporation, Santa Clara, CA (US)

(*) Notice: Subject to any disclaimer, the term of this patent is extended or adjusted under 35 U.S.C. 154(b) by 0 days.

(21) Appl. No.: 16/276,564

(22) Filed: Feb. 14, 2019

(65) Prior Publication Data

US 2019/0266935 A1 Aug. 29, 2019

Related U.S. Application Data

(60) Provisional application No. 62/636,128, filed on Feb. 27, 2018.

(51) Int. Cl.
*G09G 3/20* (2006.01)
*G06F 9/38* (2018.01)

(52) U.S. Cl.
CPC ......... *G09G 3/2051* (2013.01); *G06F 9/3877* (2013.01); *G09G 3/2066* (2013.01); *G09G 2300/0452* (2013.01)

(58) Field of Classification Search
CPC combination set(s) only.
See application file for complete search history.

(56) References Cited

U.S. PATENT DOCUMENTS

| 5,931,960 | A | * | 8/1999 | Kletter | H04N 1/4052 358/3.03 |
|---|---|---|---|---|---|
| 6,359,662 | B1 | | 3/2002 | Walker | |
| 7,843,402 | B2 | | 11/2010 | Nakadaira | |
| 8,059,070 | B2 | | 11/2011 | Odawara | |
| 2002/0019970 | A1 | | 2/2002 | Araki et al. | |
| 2006/0077489 | A1 | * | 4/2006 | Zhang | H04N 1/603 358/504 |

(Continued)

OTHER PUBLICATIONS

Notice of Allowance for U.S. Appl. No. 16/152,358, dated Nov. 20, 2019, 12 pages.

(Continued)

*Primary Examiner* — Wesner Sajous
(74) *Attorney, Agent, or Firm* — Artegis Law Group, LLP

(57) ABSTRACT

A display device includes a display controller that performs a high-throughput dithering operation. The display controller performs a quantization operation with pixel values generated by a graphics processor to generate quantized pixel values and residual error values. The display controller distributes the residual error values associated with a first group of quantized pixel values to a second group of quantized pixel values based on a set of distribution weights. A given distribution weight defines what fraction of a given residual error value is distributed to a given quantized pixel value included in the second group of quantized pixel values. The distribution weights are calibrated to permit the display controller to compute different fractions of residual error values using bit shifting logic instead of complex combinatorial logic.

20 Claims, 10 Drawing Sheets

(56) References Cited

U.S. PATENT DOCUMENTS

| | | |
|---|---|---|
| 2006/0107616 A1 | 5/2006 | Ratti et al. |
| 2006/0279522 A1 | 12/2006 | Kurihara |
| 2007/0211014 A1 | 9/2007 | Kim et al. |
| 2007/0268695 A1 | 11/2007 | Seetzen |
| 2009/0033612 A1 | 2/2009 | Roberts et al. |
| 2009/0174638 A1 | 7/2009 | Brown et al. |
| 2010/0134512 A1 | 6/2010 | Kwon et al. |
| 2010/0171690 A1 | 7/2010 | Park et al. |
| 2010/0225574 A1 | 9/2010 | Fujiwara |
| 2010/0253706 A1 | 10/2010 | Shirouzu |
| 2010/0295879 A1 | 11/2010 | Tanaka et al. |
| 2010/0315445 A1 | 12/2010 | An et al. |
| 2011/0050760 A1 | 3/2011 | Ito |
| 2011/0069095 A1 | 3/2011 | Kim et al. |
| 2011/0122170 A1 | 5/2011 | Kim et al. |
| 2011/0141077 A1 | 6/2011 | Cho |
| 2011/0205259 A1 | 8/2011 | Hagood, IV |
| 2012/0075555 A1 | 3/2012 | Parker et al. |
| 2012/0093430 A1* | 4/2012 | Sumi .................. H04N 1/4052 382/252 |
| 2012/0105509 A1 | 5/2012 | Ito |
| 2012/0154459 A1 | 6/2012 | Otoi |
| 2012/0154462 A1 | 6/2012 | Hempson et al. |
| 2013/0010016 A1 | 1/2013 | Sasaki |
| 2013/0314459 A1 | 11/2013 | Nakanishi |
| 2014/0327710 A1 | 11/2014 | Xu et al. |
| 2015/0070403 A1 | 3/2015 | Kim |
| 2015/0116378 A1 | 4/2015 | Cho et al. |
| 2016/0225301 A1 | 8/2016 | Scepanovic et al. |
| 2016/0344992 A1 | 11/2016 | D'Alfonso et al. |
| 2017/0132972 A1* | 5/2017 | Tsuchida .............. G09G 3/3233 |
| 2018/0277059 A1 | 9/2018 | Tomabechi |
| 2018/0302651 A1* | 10/2018 | Jacobson ............. H04N 19/182 |
| 2018/0336397 A1 | 11/2018 | Smith |
| 2019/0107626 A1 | 4/2019 | Marsuura |
| 2019/0188917 A1 | 6/2019 | Cho |
| 2019/0266935 A1 | 8/2019 | Roever |
| 2019/0266959 A1 | 8/2019 | Slavenburg |
| 2019/0266961 A1 | 8/2019 | Slavenburg |

OTHER PUBLICATIONS

Non-Final Office Action received for U.S. Appl. No. 16/163,516 dated Nov. 19, 2019, 22 pages.

Non-Final Office Action received for U.S. Appl. No. 16/271,743, dated Jun. 22, 2020, 31 pages.

Non-Final Office Action received for U.S. Appl. No. 16/271,743 dated Jun. 22, 2020, 36 pages.

Non-Final Office Action received for U.S. Appl. No. 16/268,438, dated Mar. 30, 2020, 40 pages.

Notice of Allowance received for U.S. Appl. No. 16/271,744, dated Mar. 17, 2020, 28 pages.

Non-Final Office Action received for U.S. Appl. No. 16/163,515, dated Mar. 3, 2020, 40 pages.

Final Office Action received for U.S. Appl. No. 16/163,516 dated Jun. 1, 2020, 30 pages.

Final Office Action for U.S. Appl. No. 16/163,515; dated Aug. 28, 2020; 30 pages.

Final Office Action for U.S. Appl. No. 16/268,438; dated Sep. 9, 2020; 15 pages.

Non-Final Office Action for U.S. Appl. No. 16/163,516; dated Sep. 24, 2020; 31 pages.

Final Office Action for U.S. Appl. No. 16/271,743; dated Oct. 14, 2020; 24 pages.

* cited by examiner

PARALLEL IMPLEMENTATION OF A DITHERING ALGORITHM FOR HIGH DATA RATE DISPLAY DEVICES

CROSS-REFERENCE TO RELATED APPLICATIONS

This application claims the priority benefit of the United States provisional patent application titled, "Modified Floyd-Steinberg Error Propagation Mechanism for High Data Rate Applications," filed on Feb. 27, 2018 and having Ser. No. 62/636,128. The subject matter of this related application is hereby incorporated herein by reference.

BACKGROUND

Field of the Various Embodiments

Embodiments of the present invention relate generally to display devices and display technology and, more specifically, to parallel implementations of a dithering algorithm for high data rate display devices.

Description of the Related Art

A conventional display device typically interoperates with a processor to display images. In operation, the processor renders a set of pixel values representing an image and transmits the set of pixel values to the display device for display. The display device then illuminates a set of screen pixels based on the set of pixel values to cause the image to be displayed.

In the above approach, the processor usually defines the set of pixel values with a specific quantization level. For example, the processor could define the set of pixel values with a 10-bit quantization level. The set of screen pixels are oftentimes illuminated to emit light with a different quantization level. For example, a given screen pixel could emit a light signal with an 8-bit quantization level. In such situations, where the quantization level associated with the set of pixel values differs from the quantization level associated with the set of screen pixels, the display device has to perform a quantization operation with the set of pixels to equilibrate the two different quantization levels. For example, the display device could perform a bit shifting operation to round down a given 10-bit pixel value to produce a quantized 8-bit pixel value, potentially truncating fractional bits as needed. The display device could then cause a given screen pixel to emit an 8-bit light signal based on the 8-bit pixel value.

When performing quantization operations, the display device normally produces quantized pixel values as well as residual error values that remain when the pixel values are rounded. For example, quantizing a 10-bit pixel value to produce an 8-bit pixel value produces both the 8-bit pixel value and a 2-bit residual error value, where the 2-bit residual error value remains after the 10-bit pixel value is rounded down to 8 bits. Some conventional display devices simply discard these types of residual error values. Other display devices cause some pixels to alternate between different pixel values quickly in order to achieve the appearance of an averaged pixel value and associated residual error value. However, other conventional display devices perform an operation known as "dithering," which entails distributing the different residual error values produced when quantizing various pixel values to other pixel values instead of discarding those residual error values. Dithering can increase the quality of images because most or all of the information included in the original version of the image is conserved and included in the dithered version of the image.

Conventional display devices configured to dither images can perform temporal and/or spatial dithering operations. Temporal dithering operations distribute residual error values across different frames of video; whereas, spatial dithering operations distribute residual error values within a given frame of video. One example of a spatial dithering algorithm is the Floyd-Steinberg algorithm. A conventional implementation of the Floyd-Steinberg algorithm involves combinatorial logic that distributes residual error values to other pixel values serially forward in scanline order. However, this approach suffers from certain drawbacks.

In particular, the combinatorial logic included in a conventional implementation of the Floyd-Steinberg algorithm is complex and can operate quite slowly. For example, the combinatorial logic can require multiple clock cycles to process just one pixel. Further, because the combinatorial logic operates on each pixel serially, the overall speed with which an image can be dithered can become severely bottlenecked. Consequently, conventional implementations of the Floyd-Steinberg algorithm cannot be effectively used in a conventional display device that processes more than one pixel per clock cycle without reducing the frame rate of the display device. Reducing the frame rate can reduce the overall quality of the user experience, especially in display devices used for gaming, where video game applications typically operate best with high frame rates.

As the foregoing illustrates, what is needed in the art is a more effective way to implement dithering algorithms in high pixel rate display devices.

SUMMARY

Various embodiments include a computer-implemented method for generating dithered images, including quantizing a first plurality of pixel values to generate a first plurality of quantized pixel values and a first plurality of residual error values, generating a plurality of intermediate error terms based on the first plurality of residual error values and a plurality of distribution weights, and modifying a second plurality of quantized pixel values based on the plurality of intermediate error terms and a second plurality of residual error values to generate a plurality of dithered pixel values, wherein the plurality of dithered pixel values corresponds to an image that is being displayed, and at least one dithered pixel value included in the plurality of dithered pixel values is generated at least partially in parallel with another dithered pixel value included in the plurality of dithered pixel values.

At least one technological advantage of the disclosed techniques is that the disclosed display controller can rapidly dither all pixels included in a given image with sufficient speed to maintain a high frame rate. Accordingly, the disclosed display controller can generate high quality dithered images without sacrificing frame rate.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive con

FIGS. 4A-4E illustrate how the dithering engine of FIG. 2 distributes residual error values across quantized pixel values to generate dithered pixel values, according to various embodiments of the present invention.

DETAILED DESCRIPTION

Figure 1:
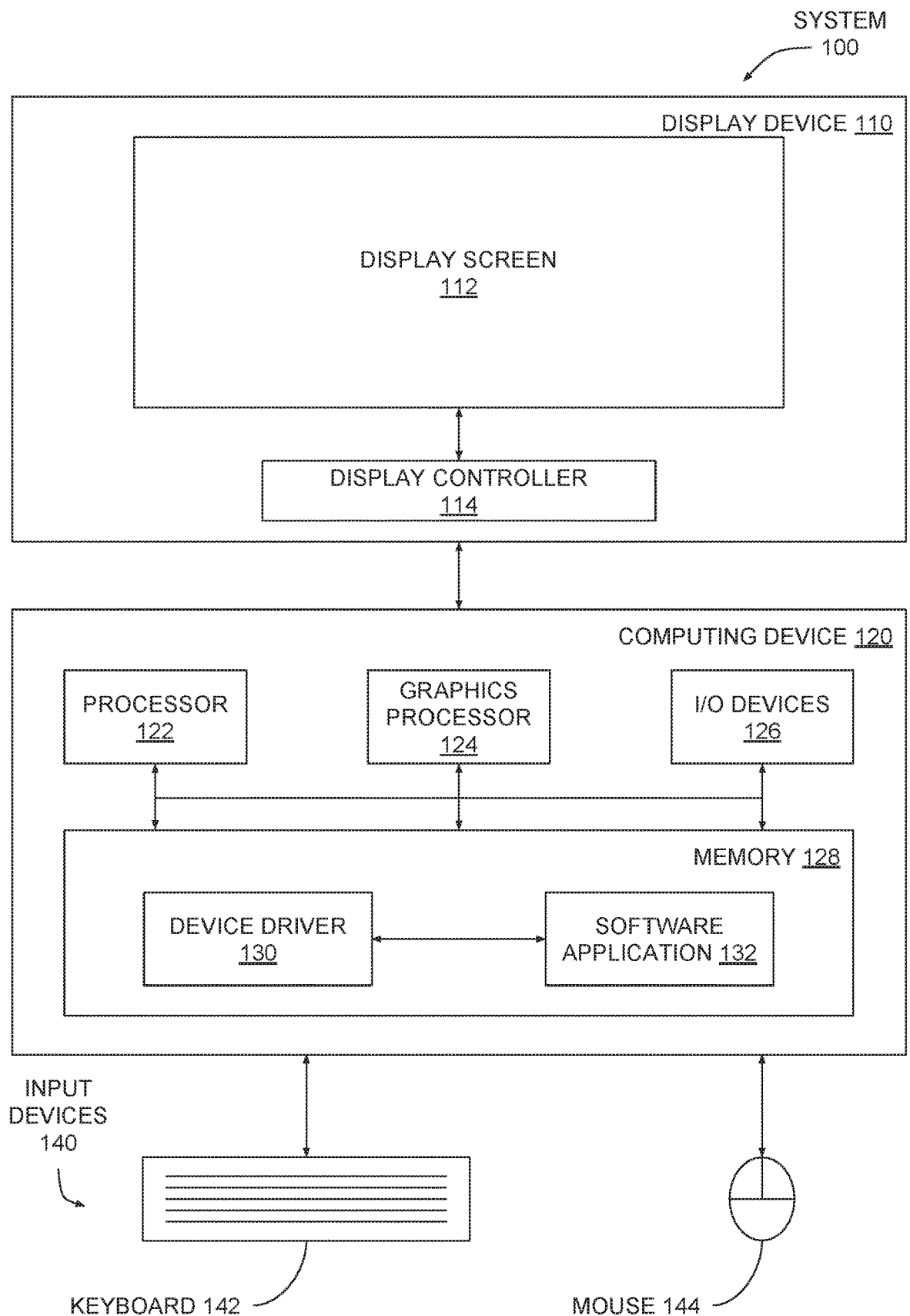
- FIG. 1 illustrates a system configured to implement one or more aspects of the present invention.

In the following description, numerous specific details are set forth to provide a more thorough understanding of the various embodiments. However, it will be apparent to one skilled in the art that the inventive concepts may be practiced without one or more of these specific details.

As noted above, a conventional display device can be configured to perform temporal and/or spatial dithering operations in order to distribute residual error values produced via quantization operations. Dithering in general can increase the quality of an image that is displayed based on quantized pixel values. One dithering algorithm, the Floyd-Steinberg dithering algorithm, distributes residual error values forward to quantized pixel values serially and in scanline order. Conventional implementations of the Floyd-Steinberg dithering algorithm suffer from specific deficiencies that limit the usefulness of such implementations in high data rate display devices, though.

In particular, a conventional implementation of the Floyd-Steinberg algorithm typically includes complex combinatorial logic that operates too slowly for efficient use in high pixel rate display devices. In practice, this combinatorial logic can require multiple clock cycles to process just one pixel. This slowly operating combinatorial logic also operates on each pixel serially, greatly reducing the overall speed with which an image can be dithered. Consequently, conventional implementations of the Floyd-Steinberg algorithm cannot be used in a conventional display device without significantly reducing the display device frame rate. These deficiencies are especially problematic in display devices designed for use with video game applications that demand a high frame rate.

To address these issues, embodiments of the invention include a display device that includes a display controller configured to perform a high throughput dithering operation. The display controller performs a quantization operation with pixel values generated by a graphics processor to generate quantized pixel values and residual error values. The display controller distributes the residual error values associated with a first group of quantized pixel values to a second group of quantized pixel values based on a set of distribution weights. A given distribution weight defines what fraction of a given residual error value is distributed to a given quantized pixel value included in the second group of quantized pixel values. The distribution weights are calibrated to permit the display controller to compute different fractions of residual error values using bit shifting logic instead of complex combinatorial logic. In this manner, the disclosed techniques isolate intra-cycle carryover and inter-cycle carryover and simplify the computations involved in the carryover process.

At least one technological advantage of the disclosed techniques is that the disclosed display controller can rapidly dither all pixels included in a given image with sufficient speed to maintain a high frame rate. Accordingly, the disclosed display controller can generate high quality dithered images without sacrificing frame rate. Because the disclosed display controller can generate images with high quality and high frame rate, the disclosed display controller is especially useful in display devices designed for gaming. The disclosed techniques therefore represent a significant technological advancement over prior art approaches that cannot dither pixels with sufficient speed.

System Overview

FIG. 1 illustrates a system configured to implement one or more aspects of the present invention. As shown, system 100 includes a display device 110 coupled to a computing device 120. Computing device 120 is coupled to input devices 140 that include a keyboard 142 and a mouse 144. Display device 110 includes a display screen 112 and a display controller 114. In one embodiment, display device 110 is an LCD with an LED backlight configured for high dynamic range (HDR) output.

Computing device 120 includes a processor 122, a graphics processor 124, input/output (I/O) devices 126, and memory 128, coupled together. Processor 122 includes any technically feasible set of hardware units configured to process data and execute software applications. For example, processor 122 could include one or more central processing units (CPUs). Graphics processor 124 includes any technically feasible set of hardware units configured to process graphics data and execute graphics applications. For example, graphics processor 124 could include one or more graphics processing units (GPUs). I/O devices 126 include any technically feasible set of devices configured to perform input and/or output operations, including, for example, a universal serial bus (USB) port, among others. Memory 128 includes any technically feasible storage media configured to store data and software applications, such as, for example, a hard disk and/or a random-access memory (RAM) module, among others. Memory 128 includes a device driver 130 and a software application 132.

Device driver 130 includes program code that is executed by processor 122 to coordinate the operation of graphics processor 124. During execution, device driver 130 acts as an interface to graphics processor 124. Software application 132 includes program code that is executed by processor 122 to generate graphics processing tasks to be performed by graphics processor 124. In operation, software application 132 transmits these graphics processing tasks to device driver 130, and device driver 130 generates machine code that can be executed by graphics processor 124 to perform the graphics processing tasks. The graphics processing tasks could include, for example, graphics rendering operations, encoding operations, decoding operations, and so forth. In one embodiment, software application 132 may be a video game that leverages graphics processor 124 to render images depicting a simulating environment.

When performing graphics rendering operations, graphics processor 124 generates pixel values on behalf of software application 132 that represent images to be displayed. Graphics processor 124 transmits these pixel values to display device 110. Display controller 114 within display device 110 quantizes the pixel values to equilibrate quantization level differences between the pixel values and the output capabilities of a set of screen pixels included in display screen 114. Display controller 114 then performs a dithering operation in order to conserve residual errors produced during quantization. Various engines included in display controller 114 that perform these operations are described in greater detail below in conjunction with FIG. 2.

Display Controller Configured for Parallel Dithering Operations

Figure 2:
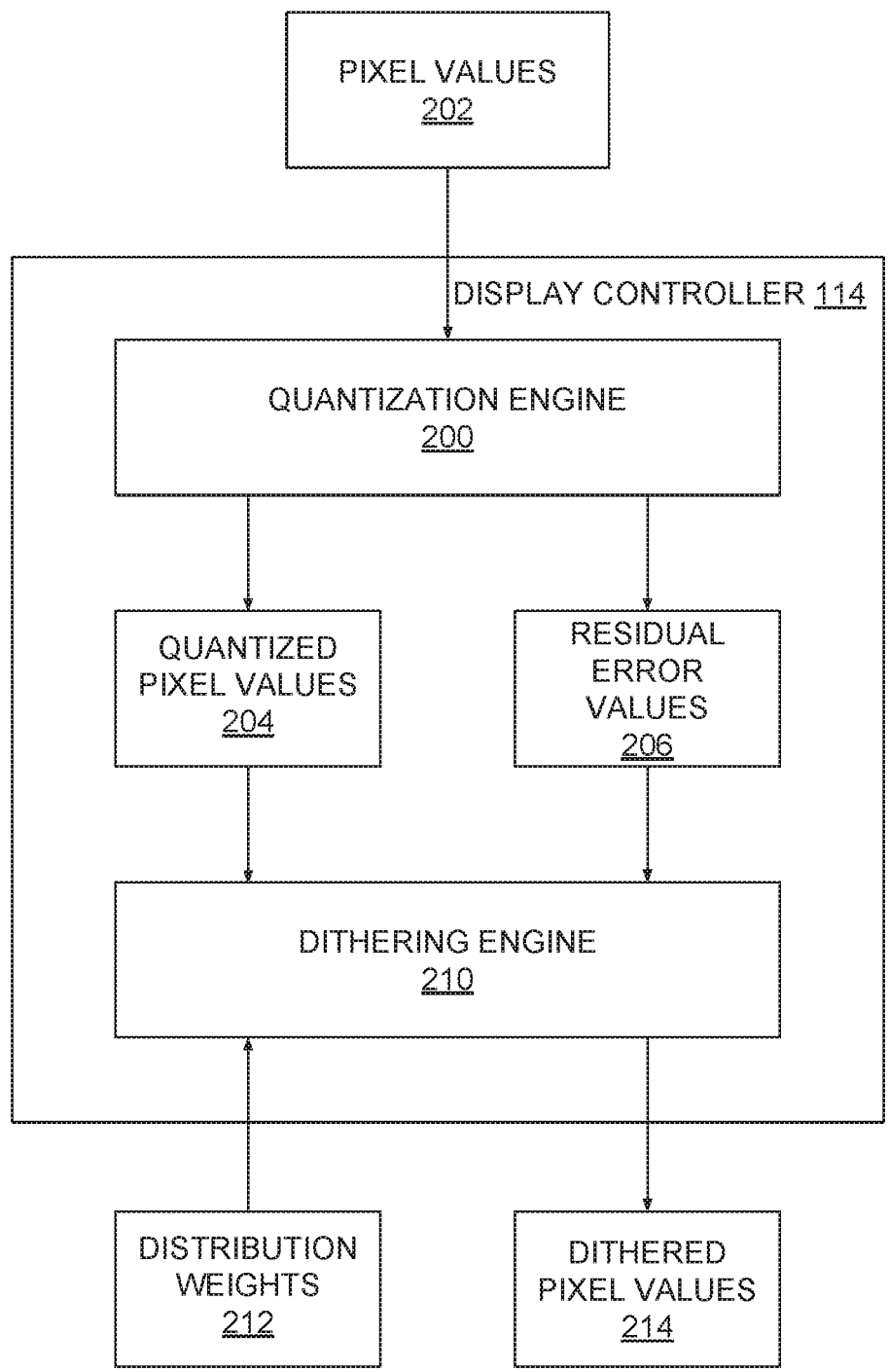
FIG. 2 is a more detailed illustration of the display controller of FIG. 1, according to various embodiments of the present invention.

FIG. 2 is a more detailed illustration of the display controller of FIG. 1, according to various embodiments of the present invention. As shown, display controller 114 includes a quantization engine 200 and a dithering engine 210.

Quantization engine 200 receives pixel values 202 from graphics processor 124 of FIG. 1 and performs a quantization operation to generate quantized pixel values 204 and residual error values 206. Pixel values 202 include a separate pixel value for each screen pixel of display screen 112. During the quantization operation, quantization engine 200 rounds each pixel value 202 down from a higher quantization level associated with graphics processor 124 to a lower quantization level associated with those screen pixels or a nearest quantization level available.

For example, quantization engine 200 could a receive a given pixel value 202 from graphics processor 124 that is defined with N bits, where N is an integer value derived from graphics rendering parameters associated with graphics processor 124. Quantization engine 200 would then round the given pixel value 202 down to produce a given quantized pixel value 204 defined with M bits, where M is an integer value less than N and is derived from the output capabilities of the screen pixels included in display screen 112. Quantization engine 200 would also produce a residual error value 206 having a number of bits derived from the difference between N and M. In this manner, quantization engine 200 quantizes each pixel value 202 included in pixel values 202 to produce a corresponding quantized pixel value 204 and an associated residual error value 206. Quantization engine 200 can perform the above approach in one or more passes, as needed.

Dithering engine 210 receives quantized pixel values 204 and residual error values 206 and then performs a parallel dithering operation to generate dithered pixel values 214. When performing the parallel dithering operation, dithering engine 210 distributes residual error values 206 across quantized pixel values 204 based on distribution weights 212, as described in greater detail below in conjunction with FIGS. 3A-3B.

Figure 3A:
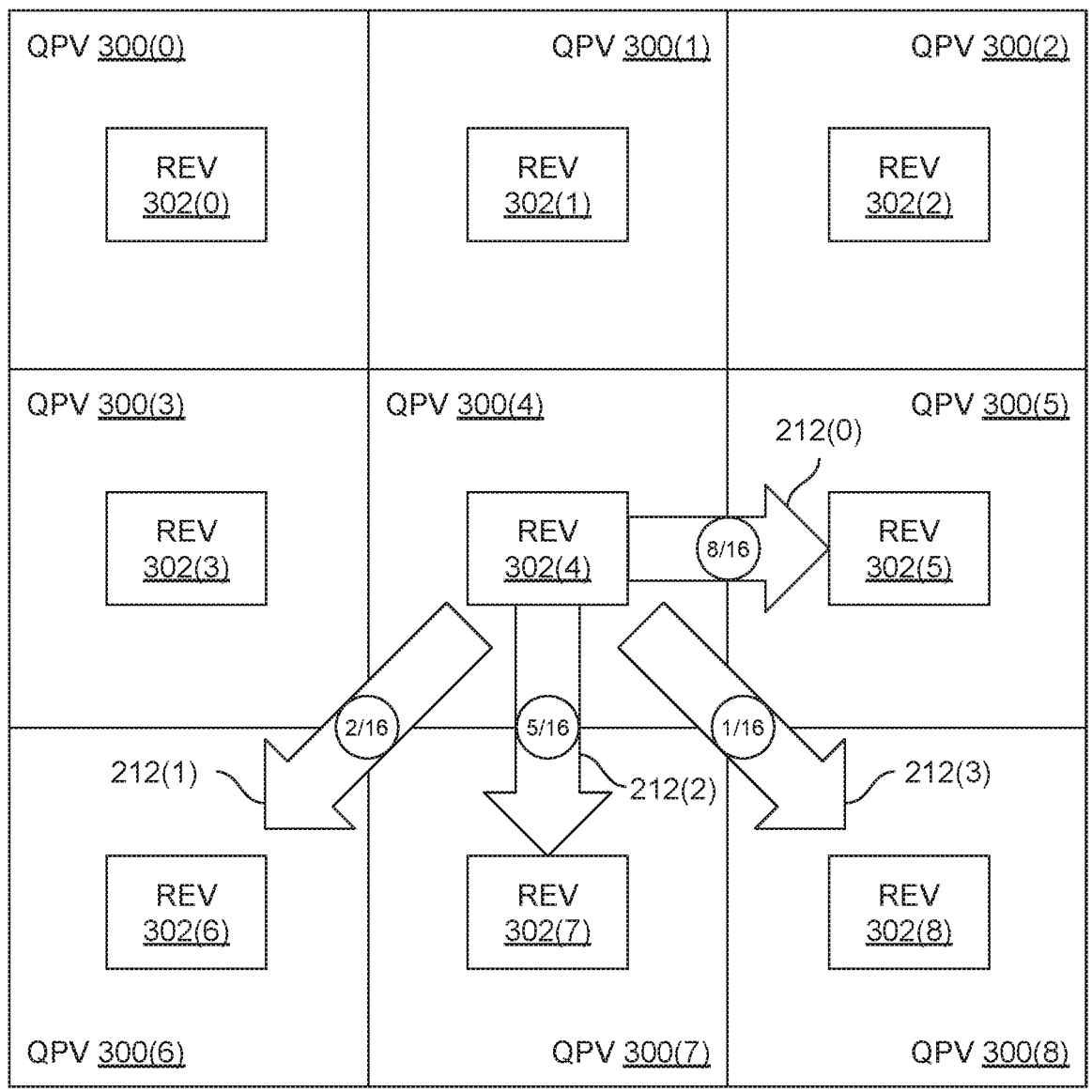
FIGS. 3A-3B illustrate how the dithering engine of FIG. 2 distributes residual error values, according to various embodiments of the present invention.
Figure 3B:
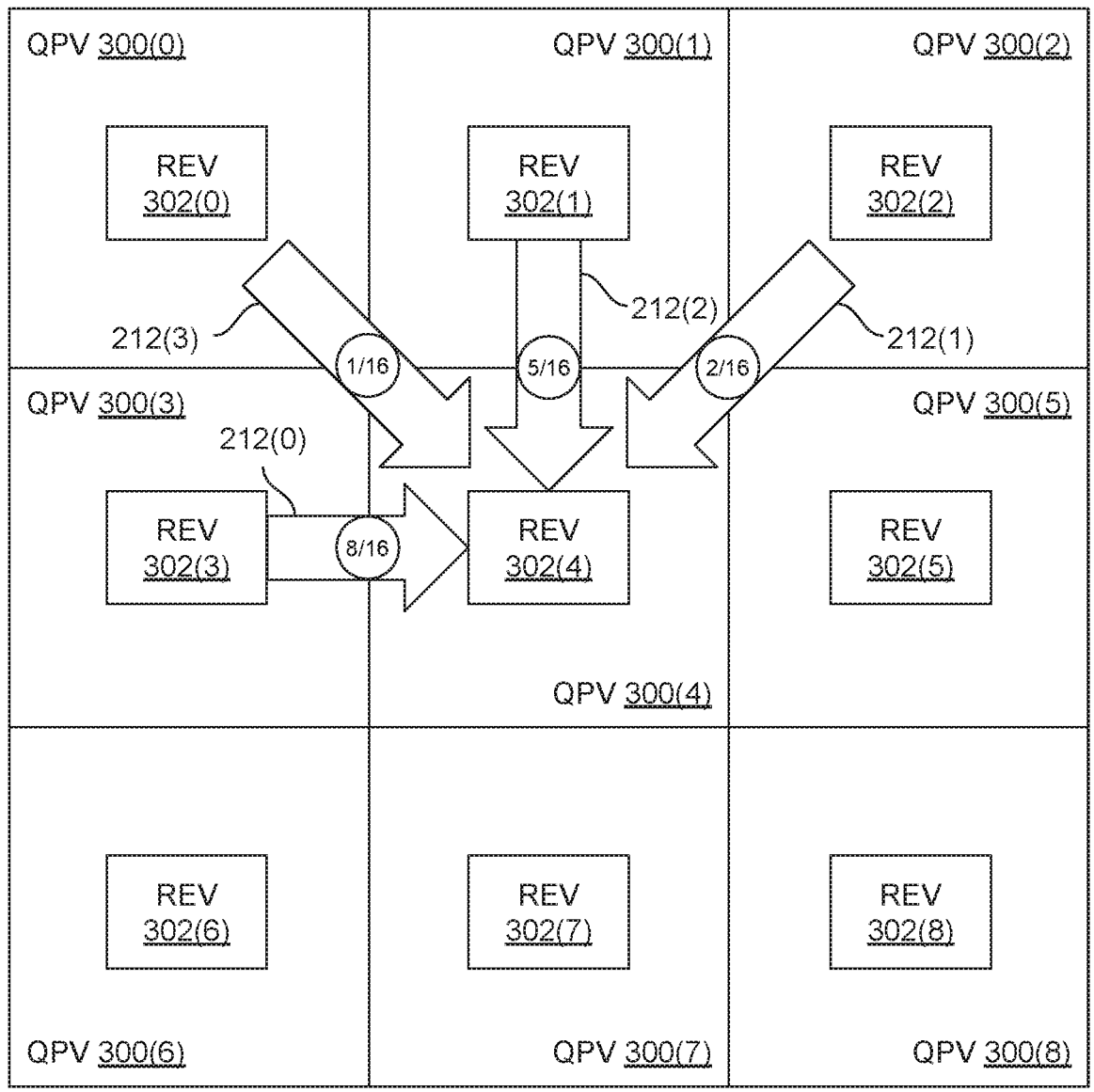

FIGS. 3A-3B illustrate how the dithering engine of FIG. 2 distributes residual error values, according to various embodiments of the present invention. As shown in FIG. 3A, a set of quantized pixel values (QPVs) 300(0) through 300(8) is arranged in a 3×3 grid. QPVs 300(0) through 300(8) are included in quantized pixel values 204 of FIG. 2. The 3×3 arrangement of QPVs 300(0) through 300(8) reflects the spatial orientation of the associated screen pixels within display screen 112, and each row of QPVs 300 corresponds to a different scanline of display screen 112.

Each QPV 300 is shown with a corresponding residual error value (shown here as REVs) 302 superimposed thereon. REVs 302 are included in residual error values 206 of FIG. 2. During the dithering operation mentioned above, dithering engine 210 distributes portions of REV 302(4) to nearby REVs 302(5), 302(6), 302(7) and 302(8) based on distribution weights 212(0), 212(1), 212(2), and 212(3).

In the example shown, distribution weight 212(0) has a value of $8/16$, distribution weight 212(1) has a value of $2/16$, distribution weight 212(2) has a value of $5/16$, and distribution weight 212(3) has a value of $1/16$. Some of these values differ from those commonly associated with the conventional Floyd-Steinberg algorithm. In particular, the Floyd-Steinberg algorithm uses a $7/16$ weight value instead of the $8/16$ weight value associated with distribution weight 212(0). Other distribution weights 212 differ to compensate for this adjustment. One advantage of changing the $7/16$ weight value to an $8/16$ weight value is that various computations can be efficiently performed with the $8/16$ weight value via bit shifting instead of the complex combinatorial logic needed to perform those computations with the $7/16$ weight value. Dithering engine 210 distributes different portions of REV 302(4) to REVs 302(5) through 302(8) via multiplication with distribution weights 212(0) through 212(3), respectively.

For example, dithering engine 210 could distribute a portion of REV 302(4) to REV 302(5) by multiplying REV 302(4) by distribution weight 212(0), having a value of $8/16$, and then adding the result of this operation to REV 302(5). Dithering engine 210 generally implements bit shifting logic when multiplying REVs 302 with distribution weights 212. Distribution weights 212 are calibrated with particular values that facilitate division via bit shifting logic. This approach advantageously expedites otherwise complex division computations.

Dithering engine 210 can distribute multiple portions of a given REV 302 simultaneously. In addition, dithering engine 210 can update a given REV 302 based on distributed portions of multiple neighboring REVs 302. Once a given REV 302 has been updated in this manner, dithering engine 210 updates the corresponding QPV 300 as well. For example, dithering engine 210 could update REV 302(4) based on distributed portions of REVs 302(0), 302(1), 302(2), and 302(3), and then update QPV 300(4) once these distributions are complete. This particular example is described in greater detail below in conjunction with FIG. 3B.

As shown in FIG. 3B, dithering engine 210 distributes different portions of REVs 302(0), 302(1), 302(2), and 302(3) to REV 302(4) based on distribution weights 212(3), 212(2), 212(1), and 212(0), respectively. Dithering engine 210 updates REV 302(4) to reflect the accumulation of these portions of REVs. Dithering engine 210 then removes an integer portion of REV 302(4) and adds this integer portion to QPV 300(4). Once QPV 300(4) is modified in this manner, QPV 300(4) is considered a dithered pixel value and may be included in dithered pixel values 214 of FIG. 2. REV 302(4) retains a fractional portion that can then be propagated onwards via additional distributions. In practice, dithering engine 210 implements several distribution stages when distributing REVs 302 to generate dithered pixel values, as described in greater detail below in conjunction with FIGS. 4A-4E.

FIGS. 4A-4E illustrate how the dithering engine of FIG. 1 distributes residual error values across quantized pixel values to generate dithered pixel values, according to various embodiments of the present invention.

Figure 4A:
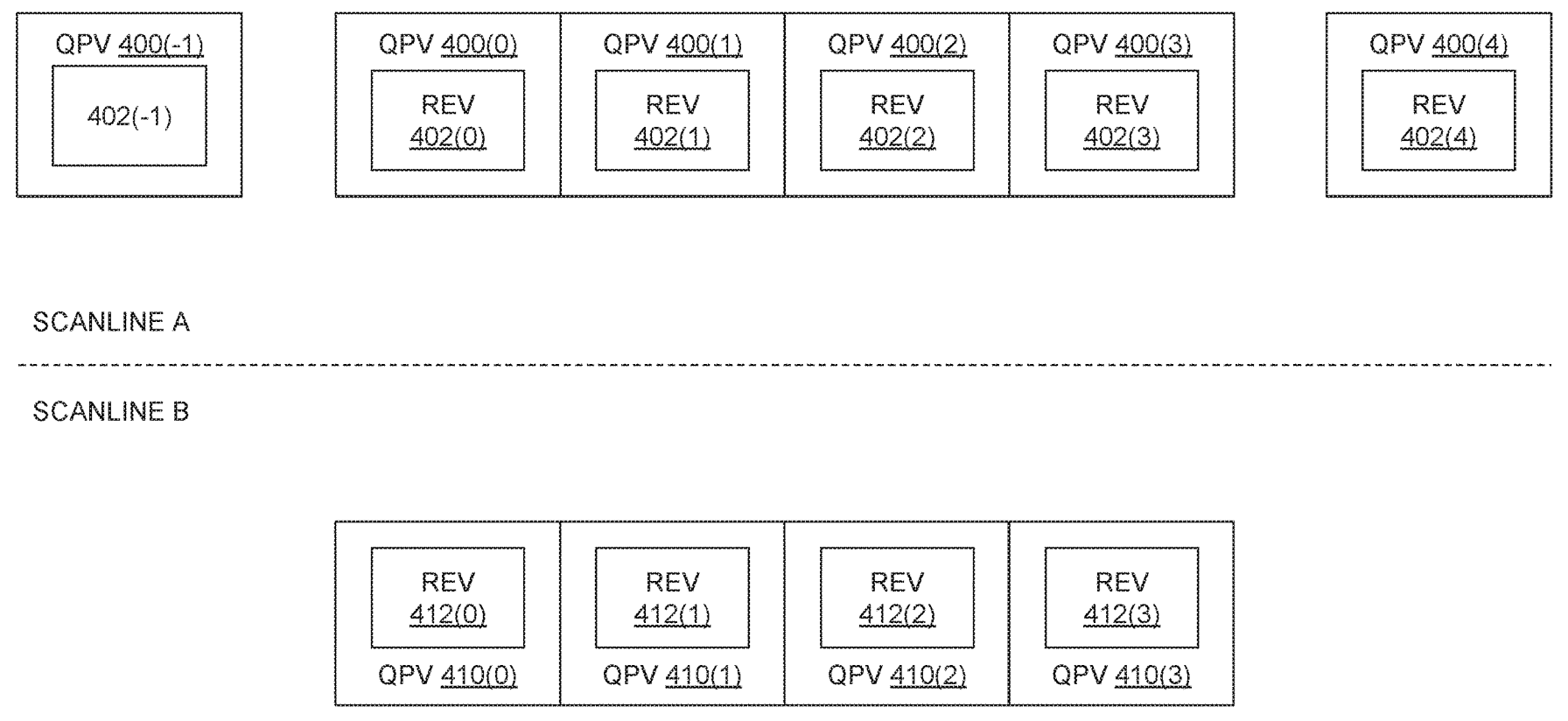

As shown in FIG. 4A, scanline A includes QPVs 400(-1) through 400(4) and corresponding REVs 402(-1) through 402(4). As also shown, scanline B includes QPVs 410(0) through 410(3) and corresponding REVs 412(0) through 412(3). QPVs 400 and 410 are included in quantized pixel values 204 of FIG. 2. REVs 402 and 412 are included in residual error values 206 of FIG. 2.

Scanlines A and B correspond to lines of screen pixels included in display screen 112. Each QPV 400 corresponds to an individual screen pixel associated with scanline A, and each QPV 410 corresponds to an individual screen pixel associated with scanline B. QPVs 400 and 410 are shown in scanline order. QPVs 400(0) through 400(3) and QPVs 410(0) through 410(3) are grouped together because dithering engine 210 processes QPVs and associated REVs in groups of four. Dithering engine 210 can also perform the techniques described herein with groups that include other numbers of QPVs and REVs. QPVs 400(-1) and 400(4) belong to other groups QPVs. In one embodiment, dithering engine 210 may have already modified QPVs 400 via distributions of previous residual error values to generated dithered pixel values.

Figure 4B:
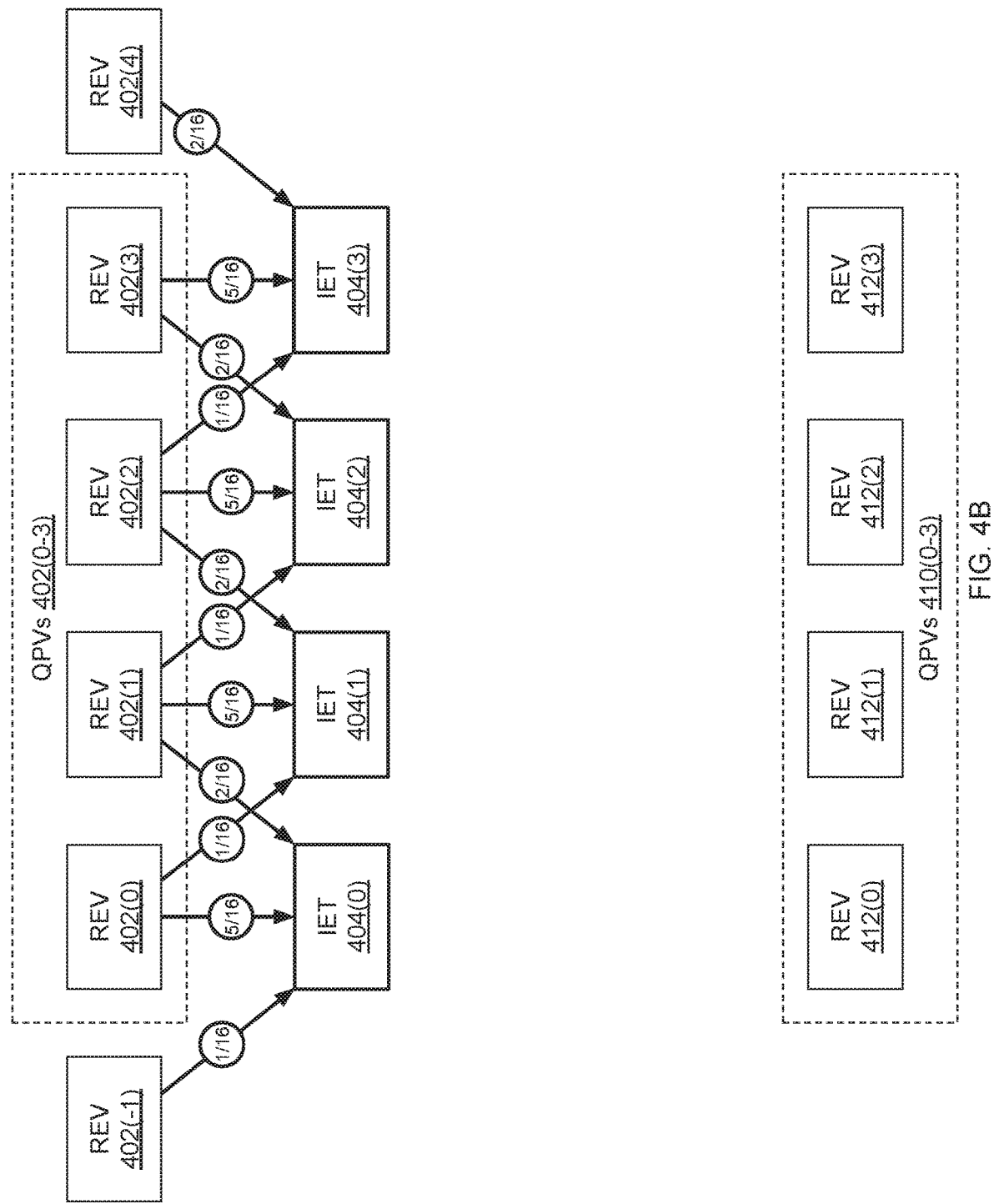

Referring now to FIG. 4B, in a first distribution stage, dithering engine 210 generates intermediate error terms 404(0) through 404(3) by distributing REVs 402(-1) through 402(4) according to distribution weights 212(1), 212(2), and 212(3). These distribution weights have values of $2/16$, $5/16$, and $1/16$, respectively, as is shown. Dithering engine 210 generates IET 404(0) by accumulating a $1/16$ portion of REV 402(-1), a $5/16$ portion of REV 402(0), and a $2/16$ portion of REV 402(1). Dithering engine 210 generates IET 404(1) by accumulating a $1/16$ portion of REV 402(0), a $5/16$ portion of REV 402(1), and a $2/16$ portion of REV 402(2). Dithering engine 210 generates IET 404(2) by accumulating a $1/16$ portion of REV 402(1), a $5/16$ portion of REV 402(2), and a $2/16$ portion of REV 402(3). Dithering engine 210 generates IET 404(3) by accumulating a $1/16$ portion of REV 402(2), a $5/16$ portion of REV 402(3), and a $2/16$ portion of REV 402(4). Dithering engine 210 generally determines the value for any given IET 404 by accumulating the fractional portions of REVs 402 distributed thereto.

In one embodiment, dithering engine 210 may perform different subsets of the distributions shown at different times depending on when the various REVs 402 become available. For example, dithering engine 210 could perform a first subset of distributions when REV 402(-1) becomes available, perform a second subset of distributions when REVs 402(0) through 402(3) become available, and then perform a third subset of distributions when REV 402(4) becomes available. A given REV may become available upon being generated by quantization engine 200 or upon being fully updated via the distribution of fractional portions of other REVs.

Figure 4C:
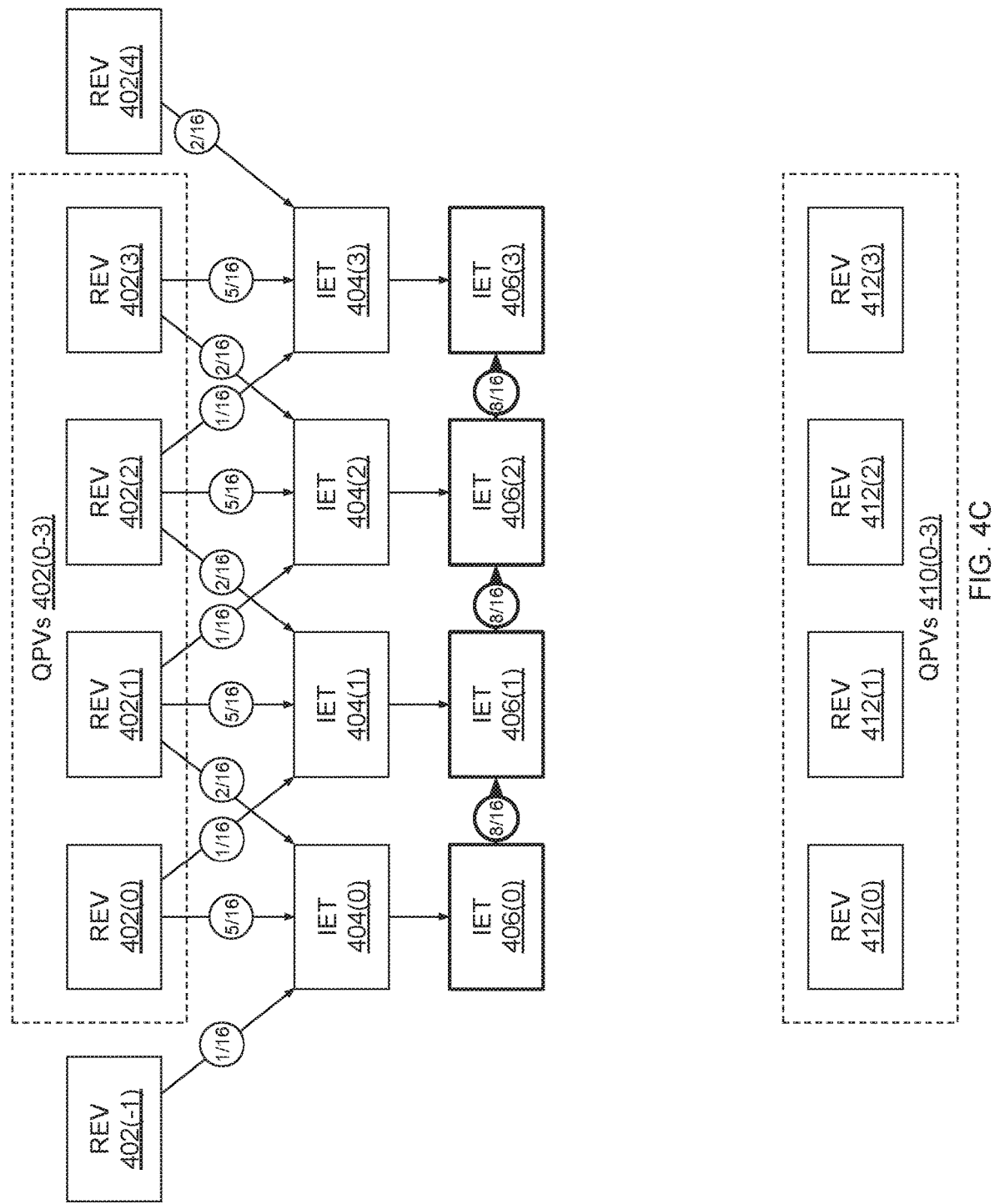

Referring now to FIG. 4C, in a second distribution stage, dithering engine 210 generates IETs 406 based on IETs 404. Dithering engine 210 copies each IET 404 to a corresponding IET 406 and then distributes IETs 406(0), 406(1), and 406(2) to the respective lateral neighbors, IETs 406(1), 406(2), and 406(3), according to distribution weight 212(0). This distribution weight has a value of $8/16$, as is shown. Thus, dithering engine 210 distributes an $8/16$ portion of IET 406(0) to IET 406(1), an $8/16$ portion of IET 406(1) to IET 406(2), and an $8/16$ portion of IET 406(2) to IET 406(3). Each of IETs 406(1), 406(2), and 406(3) adds the received distributions to a pre-existing value. Dithering engine 210 can perform these multiply-add operations via bit shifting, adding, and other arithmetic logic. Dithering engine 210 generally performs the distributions shown prior to when a residual error value associated with a previous group of pixels becomes available. These distributions are incomplete, however, until that residual error value becomes available, as described in greater detail below.

Figure 4D:
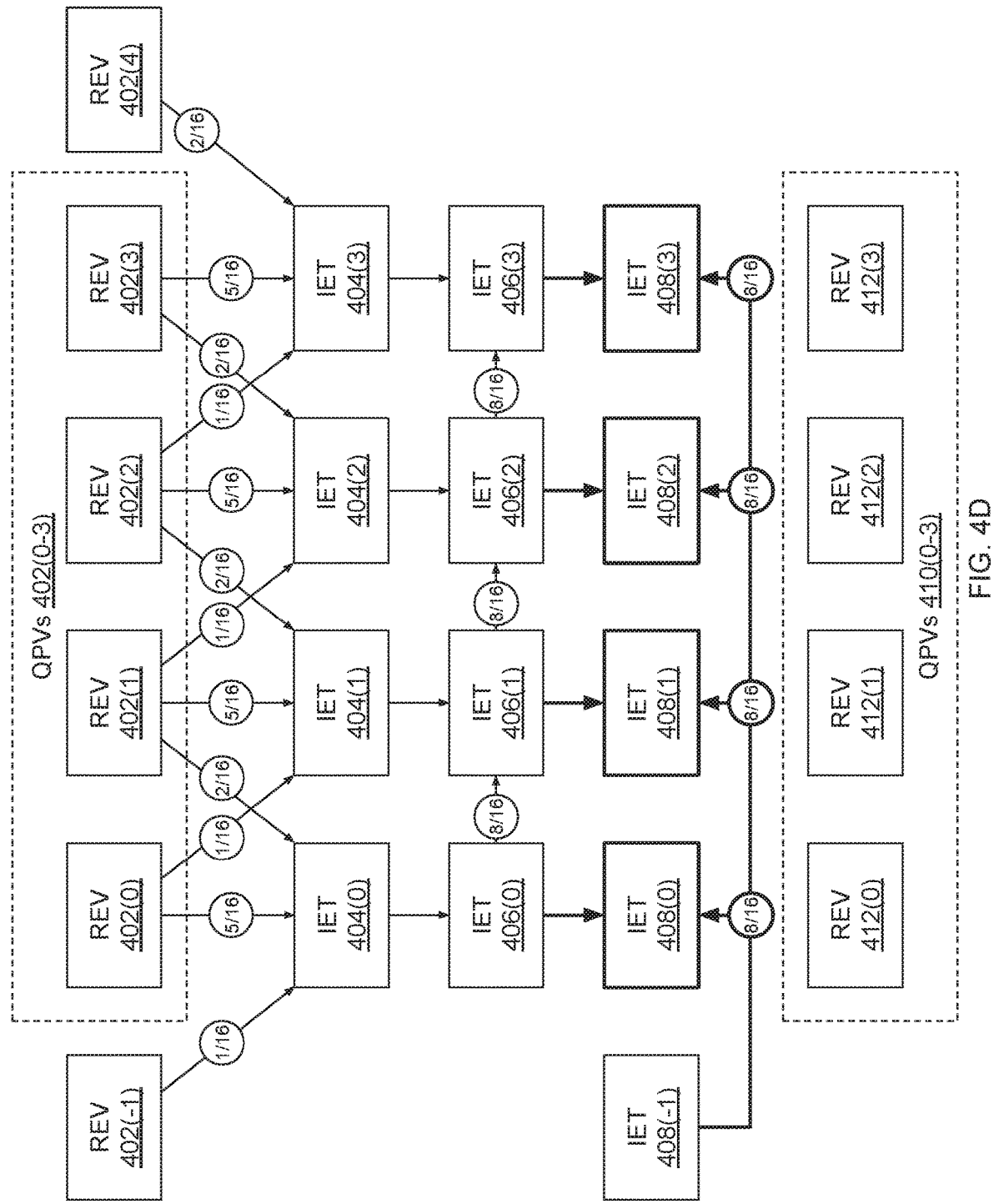

Referring now to FIG. 4D, in a third distribution stage, dithering engine 210 generates IETs 408 based on IETs 406 and IET 408(-1), once available. Dithering engine 210 generates IET 408(-1) when processing a previous group of four pixels that reside on scanline A. Dithering engine 210 copies each IET 406 to a corresponding IET 408 and then distributes IET 408(-1) according to distribution weight 212(0) having a value of $8/16$. During this distribution, dithering engine 210 multiplies IET 408(-1) by $8/16$ one or more times in the cascading manner shown to generate an appropriately sized distribution for each IET 408(0) through 408(3). Dithering engine 210 performs this technique to compensate for IET 408(-1) being unavailable during the previous distribution stage and therefore not included in the lateral distributions of IETs 406 described above. Thus, IET 408(0) is derived from IET 408(0) plus an $8/16$ portion of IET 408(-1), IET 408(1) is derived from an $(8/16)^2$ portion of IET 408(-1), IET 408(2) is derived from an $(8/16)^3$ portion of IET 408(-1), and IET 408(3) is derived from an $(8/16)^4$ portion of IET 408(-1).

Figure 4E:
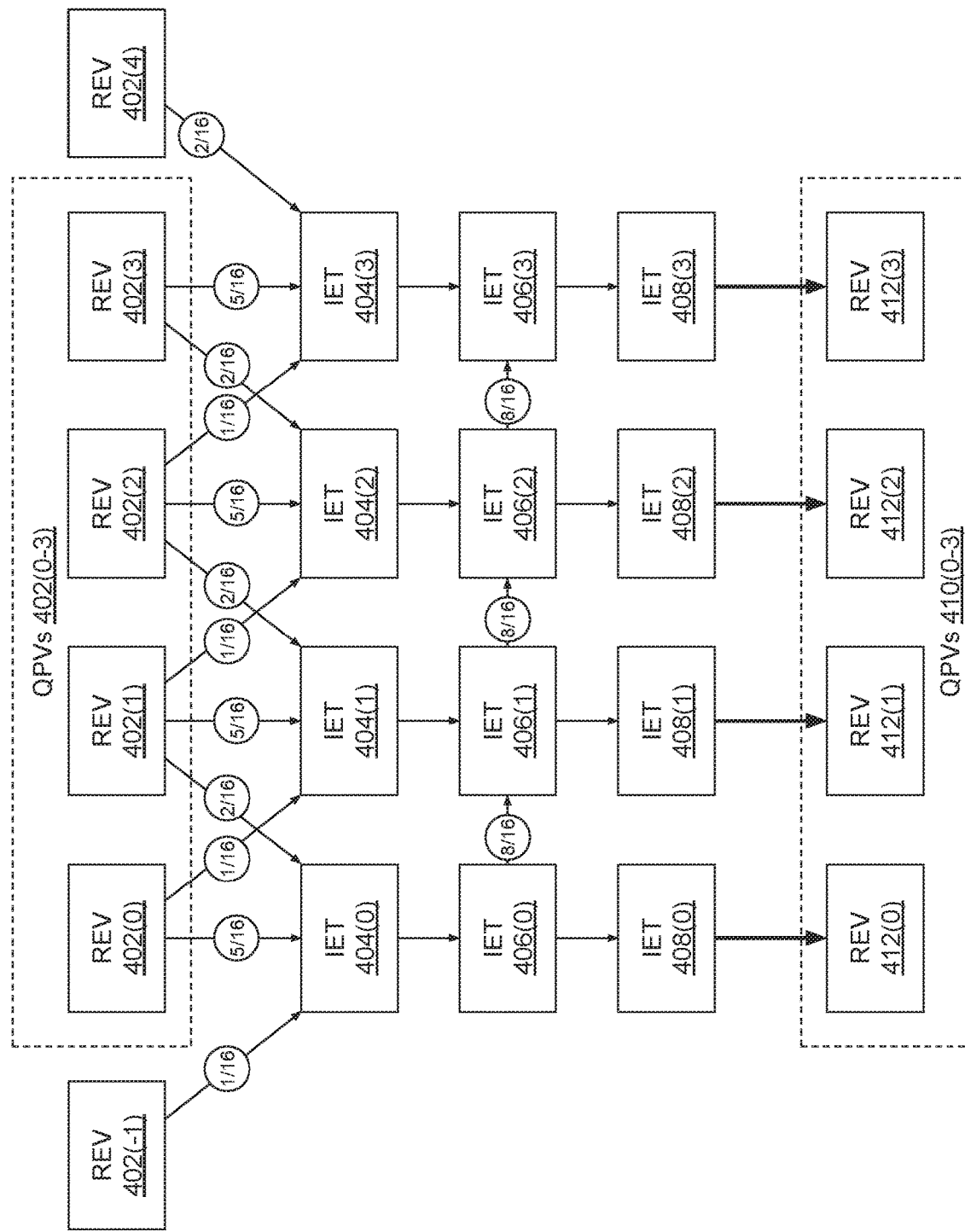

Referring now to FIG. 4E, in a final distribution stage, dithering engine 210 distributes IETs 408 to REVs 412 and QPVs 410. Dithering engine 210 adds each IET 408 to a pre-existing REV 412 and then removes the integer portion of that REV 412, leaving a fractional value behind. Dithering engine 210 then adds the integer portion to a corresponding QPV 410, thereby generating a dithered pixel value. The resultant REV 412 having a remaining fractional value can be propagated onwards to other QPVs by repeating the various distribution stages discussed above.

Referring generally to FIGS. 4A-4E, dithering engine 210 performs any of the above arithmetic operations via hardware bit shifters and accumulators, among other arithmetic logic. Dithering engine 210 can also implement any number of register stages for storing intermediate values. As a general matter, dithering engine 210 performs some or all operations associated with a given distribution stage in parallel. For example, dithering engine 210 could generate each IET 404 in parallel with generating the other IETs 404. As described herein, operations are described as or can be understood as occurring "in parallel" with one another when those operations are performed at least partially simultaneously with one another, meaning that the operations overlap, at least in-part, during execution, and do not depend on one another to complete. Although the disclosed techniques are described in relation to groups of four QPVs, persons skilled in the art will understand how to apply these techniques across any sized group of pixels.

An advantage of the disclosed approach is that dithering engine 210 can produce dithered pixels for display with sufficient throughput to maintain the high data rates commonly associated with video games. The techniques performed by dithering engine 210 are described below in conjunction with FIG. 5.

Figure 5:
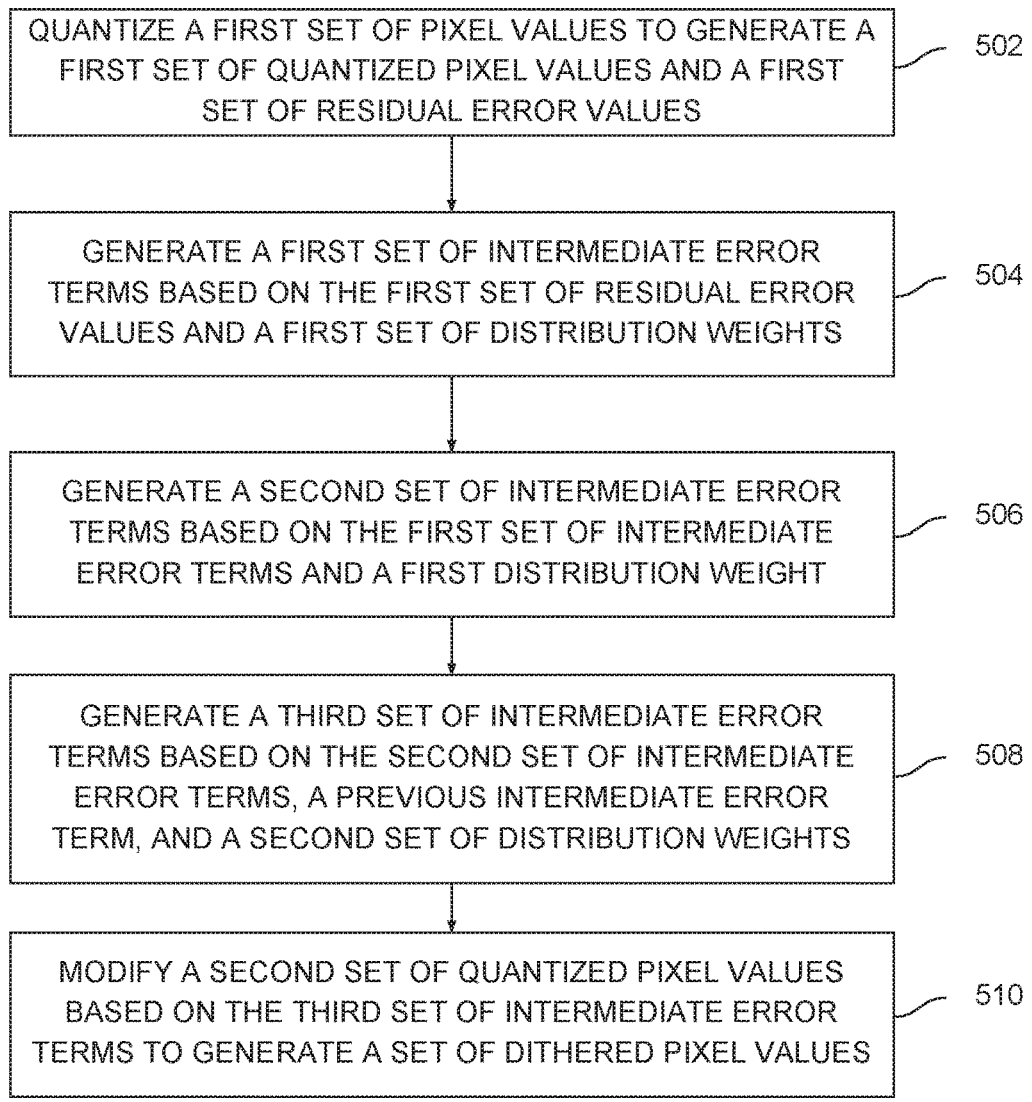
FIG. 5 is a flow diagram of method steps for generating multiple dithered pixel values, according to various embodiments of the present invention.

FIG. 5 is a flow diagram of method steps for generating multiple dithered pixel values, according to various embodiments of the present invention. Although the method steps are described in conjunction with the systems of FIGS. 1-4E, persons skilled in the art will understand that any system configured to perform the method steps in any order falls within the scope of the present invention.

As shown, a method 500 begins at step 502, where quantization engine 200 within display controller 114 quantizes a first set of pixel values to generate a first set of QPVs and a first set of REVs. Graphics processor 124 generates the first set of pixel values with a quantization level that may exceed a quantization level associated with screen pixels within display screen 112. Quantization engine 200 quantizes the received pixel values at step 502 to equilibrate these quantization differences. The first set of QPVs and the first set of REVs are associated with the same scanline, but may belong to different groups that dithering engine 210 is configured to process. For example, the first set of QPVs could include QPVs 400(-1) and 400(0) of FIG. 4A, which reside on scanline A but belong to different groups.

At step 504, dithering engine 210 generate a first set of IETs based on the first set of REVs and a first set of distribution weights. When performing step 504, dithering engine 210 distributes REVs from multiple groups of QPVs. The set of distribution weights includes some but not all of distribution weights 212. When performing step 504, dithering engine 210 may distribute REVs in one or more subsets. An example of how dithering engine 210 performs step 504 is described above in conjunction with FIG. 4B.

At step 506, dithering engine 210 generates a second set of IETs based on the first set of IETs and a first distribution weight. Dithering engine 210 copies the first set of IETs and then distributes a subset of those IETs laterally based on the first distribution weight. Dithering engine 210 may perform step 506 without complex combinatorial logic, especially when the first distribution weight is calibrated to facilitate division via bit shifting logic. An example of how dithering engine 210 performs step 506 is described above in conjunction with FIG. 4C.

At step 508, dithering engine 210 generate a third set of IETs based on the second set of IETs, a previous IET associated with a previous portion of the current scanline, and a second set of distribution weights. Dithering engine 210 waits to perform step 508 until the previous IET is available. In one embodiment, the second set of distribution weights includes the first distribution weight raised to different integer exponents. For example, the second set of distribution weights could include $8/16$, $(8/16)^2 = 4/16$, $(8/16)^3 = 2/16$, and $(8/16)^4 = 1/16$. Dithering engine 210 distributes the previous IET in this manner to account for the previous IET not being available at step 506. An example of how dithering engine 210 performs step 506 is described above in conjunction with FIG. 4D.

At step 510, dithering engine 210 modifies a second set of QPVs and a second set of REVs based on the third set of IETs to generate a set of dithered pixel values. The second set of QPVs and the second set of REVs are generated by quantization engine 200 at or after step 502 is performed. Dithering engine 210 adds each IET in the third set of IETs to a different REV included in the second set of REVs and then removes the integer portion each REV, leaving a fractional value behind. Dithering engine 210 then adds the integer portion to a corresponding QPV in the second set of QPVs, thereby generating a dithered pixel value. The resultant REVs can be propagated onwards to other QPVs by repeating the method 500.

In sum, a display device includes a display controller that performs a high-throughput dithering operation. The display controller performs a quantization operation with pixel values generated by a graphics processor to generate quantized pixel values and residual error values. The display controller distributes the residual error values associated with a first group of quantized pixel values to a second group of quantized pixel values based on a set of distribution weights. A given distribution weight defines what fraction of a given residual error value is distributed to a given quantized pixel value included in the second group of quantized pixel values. The distribution weights are calibrated to permit the display controller to compute different fractions of residual error values using bit shifting logic instead of complex combinatorial logic.

At least one technological advantage of the disclosed techniques is that the disclosed display controller can rapidly dither all pixels included in a given image with sufficient speed to maintain a high frame rate. Accordingly, the disclosed display controller can generate high quality dithered images without sacrificing frame rate. Because the disclosed display controller can generate images with high quality and high frame rate, the disclosed display controller is especially useful in display devices designed gaming. The disclosed techniques therefore represent a significant technological advancement over prior art approaches that cannot dither pixels with sufficient speed.

1. Some embodiments include a computer-implemented method for generating dithered images, the method comprising quantizing a first plurality of pixel values to generate a first plurality of quantized pixel values and a first plurality of residual error values, generating a plurality of intermediate error terms based on the first plurality of residual error values and a plurality of distribution weights, and modifying a second plurality of quantized pixel values based on the plurality of intermediate error terms and a second plurality of residual error values to generate a plurality of dithered pixel values, wherein the plurality of dithered pixel values corresponds to an image that is being displayed, and at least one dithered pixel value included in the plurality of dithered pixel values is generated at least partially in parallel with another dithered pixel value included in the plurality of dithered pixel values.

2. The computer-implemented method of clause 1, wherein generating the plurality of intermediate error terms comprises generating a first set of intermediate error terms based on the first plurality of residual error values and a first set of distribution weights, generating a second set of intermediate error terms based on the first set of intermediate error terms and a first distribution weight, and generating a third set of intermediate error terms based on the second set of intermediate error terms, a first residual error value, and a second set of distribution weights.

3. The computer-implemented method of any of clauses 1-2, wherein generating the first set of intermediate error terms comprises multiplying a first subset of the first plurality of residual error values by the first set of distribution weights to generate multiplication results, and accumulating the multiplication results to produce a first intermediate error term included in the first set of intermediate error terms.

4. The computer-implemented method of any of clauses 1-3, wherein generating the second set of intermediate error terms comprises multiplying a first intermediate error term included in the first set of intermediate error terms by the first distribution weight to generate a multiplication result, and adding the multiplication result to a second intermediate error term included in the first set of intermediate error terms to generate a third intermediate error term included in the second set of intermediate error terms.

5. The computer-implemented method of any of clauses 1-4, wherein generating the third set of intermediate error terms comprises multiplying a first residual error term that is not included in the first set of residual error terms by an exponentiated version of the first distribution weight to generate a multiplication result, and adding the multiplication result to a first intermediate error term included in the second set of intermediate error terms to generate a third intermediate error term included in the third set of intermediate error terms.

6. The computer-implemented method of any of clauses 1-5, wherein modifying the second plurality of quantized pixel values comprises combining a first intermediate error term included in the third set of intermediate error terms with a second residual error value included in the second plurality of residual error values to generate a modified second residual error value, and combining an integer portion of the modified second residual error value with a first quantized pixel value included in the second plurality of quantized pixel values to generate a first dithered pixel value included in the plurality of dithered pixel values.

7. The computer-implemented method of any of clauses 1-6, wherein the first set of intermediate error terms, the second set of intermediate error terms, and the third set of intermediate error terms are generated by performing a bit shifting operation to multiply at least one intermediate error term by at least one distribution weight.

8. The computer-implemented method of any of clauses 1-7, wherein the plurality of distribution weights includes the first set of distribution weights and the first distribution weight, and the second set of distribution weights includes a plurality of different exponentiated versions of the first distribution weight.

9. The computer-implemented method of any of clauses 1-8, wherein at least two intermediate error terms included in the first set of intermediate error terms are generated at least partially in parallel with one another.

10. The computer-implemented method of any of clauses 1-9, wherein quantizing the first plurality of pixel values comprises performing a rounding operation with a first P bit value included in the first plurality of pixel values to generate a first Q bit value included in the first plurality of quantized pixel values and a first R bit value included in the first plurality of residual error values, wherein each of P, Q and R is an integer value and R is equal to P minus Q.

11. Some embodiments include a display device, comprising a display screen, and a display controller that causes the display screen to display an image by quantizing a first plurality of pixel values to generate a first plurality of quantized pixel values and a first plurality of residual error values, generating a plurality of intermediate error terms based on the first plurality of residual error values and a plurality of distribution weights, and modifying a second plurality of quantized pixel values based on the plurality of intermediate error terms and a second plurality of residual error values to generate a plurality of dithered pixel values, wherein the plurality of dithered pixel values corresponds to the image, and at least one dithered pixel value included in the plurality of dithered pixel values is generated at least partially in parallel with another dithered pixel value included in the plurality of dithered pixel values.

12. The display device of clause 11, wherein the display controller generates the plurality of intermediate error terms by generating a first set of intermediate error terms based on the first plurality of residual error values and a first set of distribution weights, generating a second set of intermediate error terms based on the first set of intermediate error terms and a first distribution weight, and generating a third set of intermediate error terms based on the second set of intermediate error terms, a first residual error value, and a second set of distribution weights.

13. The display device of any of clauses 11-12, wherein the display controller generates the first set of intermediate error terms by multiplying a first subset of the first plurality of residual error values by the first set of distribution weights to generate multiplication results, and accumulating the multiplication results to produce a first intermediate error term included in the first set of intermediate error terms.

14. The display device of any of clauses 11-13, wherein the display controller generates the second set of intermediate error terms by multiplying a first intermediate error term included in the first set of intermediate error terms by the first distribution weight to generate a multiplication result, and adding the multiplication result to a second intermediate error term included in the first set of intermediate error terms to generate a third intermediate error term included in the second set of intermediate error terms.

15. The display device of any of clauses 11-14, wherein the display controller generates the third set of intermediate error terms by multiplying a first residual error term that is not included in the first set of residual error terms by an exponentiated version of the first distribution weight to generate a multiplication result, and adding the multiplication result to a first intermediate error term included in the second set of intermediate error terms to generate a third intermediate error term included in the third set of intermediate error terms.

16. The display device of any of clauses 11-15, wherein the display controller modifies the second plurality of quantized pixel values by combining a first intermediate error term included in the third set of intermediate error terms with a second residual error value included in the second plurality of residual error values to generate a modified second residual error value, and combining an integer portion of the modified second residual error value with a first quantized pixel value included in the second plurality of quantized pixel values to generate a first dithered pixel value included in the plurality of dithered pixel values.

17. The display device of any of clauses 11-16, wherein the display controller generates the first set of intermediate error terms by performing at least two bit shifting operation at least partially in parallel to multiply at least two residual error values included in the first plurality of residual error values with the first set of distribution weights.

18. The display device of any of clauses 11-17, wherein the display screen includes a plurality of light sources, and a plurality of screen pixels that emit light corresponding to the plurality of dithered pixel values when illuminated by the plurality of light sources.

19. The display device of any of clauses 11-18, further comprising quantizing a second plurality of pixel values to generate the second plurality of quantized pixel values and the second plurality of residual error values, wherein quantizing the second plurality of pixel values comprises performing a rounding operation with a first P bit value included in the second plurality of pixel values to generate a first Q bit value included in the second plurality of quantized pixel values and a first R bit value included in the second plurality of residual error values, wherein each of P, Q and R is an integer value and R is equal to P minus Q.

20. Some embodiments include a subsystem for generating dithered images, the subsystem comprising a quantization engine that performs the steps of quantizing a first plurality of pixel values to generate a first plurality of quantized pixel values and a first plurality of residual error values, and a dithering engine that performs the steps of generating a plurality of intermediate error values based on the first plurality of residual error values and a plurality of distribution weights, and modifying a second plurality of quantized pixel values based on the plurality of intermediate error terms and a second plurality of residual error values to generate a plurality of dithered pixel values, wherein the plurality of dithered pixel values corresponds to an image that is being displayed, and at least one dithered pixel value included in the plurality of dithered pixel values is generated at least partially in parallel with another dithered pixel value included in the plurality of dithered pixel values.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating dithered images, the method comprising:
   quantizing a first plurality of pixel values to generate a first plurality of quantized pixel values and a first plurality of residual error values;
   generating a plurality of intermediate error values based on the first plurality of residual error values and a plurality of distribution weights; and
   modifying a second plurality of quantized pixel values based on the plurality of intermediate error values and a second plurality of residual error values to generate a plurality of dithered pixel values,
   wherein the plurality of dithered pixel values corresponds to an image that is being displayed, and at least one dithered pixel value included in the plurality of dithered pixel values is generated at least partially in parallel with another dithered pixel value included in the plurality of dithered pixel values.

2. The computer-implemented method of claim 1, wherein generating the plurality of intermediate error values comprises:
   generating a first set of intermediate error values based on the first plurality of residual error values and a first set of distribution weights;
   generating a second set of intermediate error values based on the first set of intermediate error values and a first distribution weight; and
   generating a third set of intermediate error values based on the second set of intermediate error values, a previous intermediate error value, and a second set of distribution weights.

3. The computer-implemented method of claim 2, wherein generating the first set of intermediate error values comprises:
   multiplying a first subset of the first plurality of residual error values by the first set of distribution weights to generate multiplication results; and
   accumulating the multiplication results to produce a first intermediate error value included in the first set of intermediate error values.

4. The computer-implemented method of claim 2, wherein generating the second set of intermediate error values comprises:
   multiplying a first intermediate error term value included in the first set of intermediate error values by the first distribution weight to generate a multiplication result; and
   adding the multiplication result to a second intermediate error value included in the first set of intermediate error values to generate a third intermediate error value included in the second set of intermediate error values.

5. The computer-implemented method of claim 2, wherein generating the third set of intermediate error values comprises:
   multiplying the previous intermediate error value by an exponentiated version of the first distribution weight to generate a multiplication result; and
   adding the multiplication result to a first intermediate error value included in the second set of intermediate error values to generate a third intermediate error value included in the third set of intermediate error values.

6. The computer-implemented method of claim 2, wherein modifying the second plurality of quantized pixel values comprises:
   combining a first intermediate error value included in the third set of intermediate error values with a second residual error value included in the second plurality of residual error values to generate a modified second residual error value; and
   combining an integer portion of the modified second residual error value with a first quantized pixel value included in the second plurality of quantized pixel values to generate a first dithered pixel value included in the plurality of dithered pixel values.

7. The computer-implemented method of claim 2, wherein the first set of intermediate error values, the second set of intermediate error values, and the third set of intermediate error values are generated by performing a bit shifting operation to multiply at least one intermediate error value by at least one distribution weight.

8. The computer-implemented method of claim 2, wherein the plurality of distribution weights includes the first set of distribution weights and the first distribution weight, and the second set of distribution weights includes a plurality of different exponentiated versions of the first distribution weight.

9. The computer-implemented method of claim 2, wherein at least two intermediate error values included in the first set of intermediate error values are generated at least partially in parallel with one another.

10. The computer-implemented method of claim 1, wherein quantizing the first plurality of pixel values comprises performing a rounding operation with a first P bit value included in the first plurality of pixel values to generate a first Q bit value included in the first plurality of quantized pixel values and a first R bit value included in the first plurality of residual error values, wherein each of P, Q and R is an integer value and R is equal to P minus Q, wherein Q comprises an integer value greater than zero, and an integer value of P is greater than the integer value of Q.

11. A display device, comprising:
   a display screen; and
   a display controller that causes the display screen to display an image by:
      quantizing a first plurality of pixel values to generate a first plurality of quantized pixel values and a first plurality of residual error values,
      generating a plurality of intermediate error values based on the first plurality of residual error values and a plurality of distribution weights, and
      modifying a second plurality of quantized pixel values based on the plurality of intermediate error values and a second plurality of residual error values to generate a plurality of dithered pixel values,
      wherein the plurality of dithered pixel values corresponds to the image, and at least one dithered pixel value included in the plurality of dithered pixel values is generated at least partially in parallel with another dithered pixel value included in the plurality of dithered pixel values.

12. The display device of claim 11, wherein the display controller generates the plurality of intermediate error values by:
   generating a first set of intermediate error values based on the first plurality of residual error values and a first set of distribution weights;
   generating a second set of intermediate error values based on the first set of intermediate error values and a first distribution weight; and
   generating a third set of intermediate error values based on the second set of intermediate error values, a previous intermediate error value, and a second set of distribution weights.

13. The display device of claim 12, wherein the display controller generates the first set of intermediate error values by:
   multiplying a first subset of the first plurality of residual error values by the first set of distribution weights to generate multiplication results; and
   accumulating the multiplication results to produce a first intermediate error value included in the first set of intermediate error values.

14. The display device of claim 12, wherein the display controller generates the second set of intermediate error values by:
   multiplying a first intermediate error value included in the first set of intermediate error values by the first distribution weight to generate a multiplication result; and
   adding the multiplication result to a second intermediate error value included in the first set of intermediate error values to generate a third intermediate error value included in the second set of intermediate error values.

15. The display device of claim 12, wherein the display controller generates the third set of intermediate error values by:
   multiplying the previous intermediate error value by an exponentiated version of the first distribution weight to generate a multiplication result; and
   adding the multiplication result to a first intermediate error value included in the second set of intermediate error values to generate a third intermediate error value included in the third set of intermediate error values.

16. The display device of claim 12, wherein the display controller modifies the second plurality of quantized pixel values by:
   combining a first intermediate error value included in the third set of intermediate error values with a second residual error value included in the second plurality of residual error values to generate a modified second residual error value; and
   combining an integer portion of the modified second residual error value with a first quantized pixel value included in the second plurality of quantized pixel values to generate a first dithered pixel value included in the plurality of dithered pixel values.

17. The display device of claim 12, wherein the display controller generates the first set of intermediate error values by performing at least two bit shifting operation at least partially in parallel to multiply at least two residual error values included in the first plurality of residual error values with the first set of distribution weights.

18. The display device of claim 11, wherein the display screen includes:
   a plurality of light sources; and
   a plurality of screen pixels that emit light corresponding to the plurality of dithered pixel values when illuminated by the plurality of light sources.

19. The display device of claim 11, further comprising quantizing a second plurality of pixel values to generate the second plurality of quantized pixel values and the second plurality of residual error values, wherein quantizing the second plurality of pixel values comprises performing a rounding operation with a first P bit value included in the second plurality of pixel values to generate a first Q bit value included in the second plurality of quantized pixel values and a first R bit value included in the second plurality of residual error values, wherein each of P, Q and R is an integer value and R is equal to P minus Q, wherein Q comprises an integer value greater than zero, and an integer value of P is greater than the integer value of Q.

20. A subsystem for generating dithered images, the subsystem comprising:
   a quantization engine that performs the steps of:
      quantizing a first plurality of pixel values to generate a first plurality of quantized pixel values and a first plurality of residual error values; and
   a dithering engine that performs the steps of:
      generating a plurality of intermediate error values based on the first plurality of residual error values and a plurality of distribution weights, and
      modifying a second plurality of quantized pixel values based on the plurality of intermediate error values and a second plurality of residual error values to generate a plurality of dithered pixel values,
      wherein the plurality of dithered pixel values corresponds to an image that is being displayed, and at least one dithered pixel value included in the plurality of dithered pixel values is generated at least partially in parallel with another dithered pixel value included in the plurality of dithered pixel values.

* * * * *

UNITED STATES PATENT AND TRADEMARK OFFICE
CERTIFICATE OF CORRECTION

| | | |
|---|---|---|
| PATENT NO. | : 10,909,903 B2 | Page 1 of 1 |
| APPLICATION NO. | : 16/276564 | |
| DATED | : February 2, 2021 | |
| INVENTOR(S) | : Jens Roever and Robert Jan Schutten | |

It is certified that error appears in the above-identified patent and that said Letters Patent is hereby corrected as shown below:

In the Claims

Column 15, Claim 4, Line 4, please delete "term".

Signed and Sealed this
First Day of June, 2021

Drew Hirshfeld
*Performing the Functions and Duties of the*
*Under Secretary of Commerce for Intellectual Property and*
*Director of the United States Patent and Trademark Office*